United States Patent
Sanders et al.

(10) Patent No.: US 11,625,179 B2
(45) Date of Patent: Apr. 11, 2023

(54) CACHE INDEXING USING DATA ADDRESSES BASED ON DATA FINGERPRINTS

(71) Applicant: International Business Machines Corporation, Armonk, NY (US)

(72) Inventors: Lee Jason Sanders, Chichester (GB); Ben Sasson, North Baddesley (GB); Gordon Douglas Hutchison, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 17/180,903

(22) Filed: Feb. 22, 2021

(65) Prior Publication Data

US 2022/0269657 A1   Aug. 25, 2022

(51) Int. Cl.
*G06F 3/06* (2006.01)
*G06F 12/0893* (2016.01)

(52) U.S. Cl.
CPC ............ *G06F 3/0641* (2013.01); *G06F 3/067* (2013.01); *G06F 3/0613* (2013.01); *G06F 12/0893* (2013.01); *G06F 2212/1041* (2013.01)

(58) Field of Classification Search
None
See application file for complete search history.

(56) References Cited

U.S. PATENT DOCUMENTS 8,706,971 B1 * 4/2014 Nayak .................. G06F 11/1453
711/141
2016/0357674 A1   12/2016 Waldspurger
(Continued)

FOREIGN PATENT DOCUMENTS

WO   WO-2015042909 A1 *   4/2015  ......... G06F 12/0813
WO   2021022274 A1   2/2021
WO   WO-2021022274 A1 *   2/2021

OTHER PUBLICATIONS

"Patent Cooperation Treaty PCT Notification of Transmittal of the International Search Report and the Written Opinion of the International Searching Authority, or the Declaration", International application No. PCT/EP2022/052388, International filing date Feb. 2, 2022 (Feb. 2, 2022), dated May 23, 2022 (May 23, 2022), 17 pages.

(Continued)

*Primary Examiner* — Michael Alsip
(74) *Attorney, Agent, or Firm* — Stephen R. Yoder

(57) ABSTRACT

A cache storage system indexing method is provided that indexes a data address in a cache storage system based on a data fingerprint of the cached data, wherein the data fingerprint is generated by a deduplication fingerprint function used for referencing deduplication of data in the cache storage system. A computer-implemented method of data operations to a cache storage system is also provided including: obtaining a data fingerprint for the data of the data operation, either by applying a deduplication fingerprinting function to data of a write operation or by accessing deduplication metadata for a read operation to obtain the data fingerprint generated by using a deduplication fingerprinting function used for deduplication of data in the cache storage system; and using an indexing service to the cache storage system having an address schema based on the data fingerprints of the data.

23 Claims, 10 Drawing Sheets

(56) References Cited

U.S. PATENT DOCUMENTS

2017/0177266 A1   6/2017  Doerner
2020/0019330 A1*  1/2020  Brandt ................ G06F 12/0802
2020/0057752 A1   2/2020  Tofano

OTHER PUBLICATIONS

Mell et al., "The NIST Definition of Cloud Computing", National Institute of Standards and Technology, Special Publication 800-145, Sep. 2011, 7 pages.

* cited by examiner

CACHE INDEXING USING DATA ADDRESSES BASED ON DATA FINGERPRINTS

BACKGROUND

The present invention relates to cache storage, and more specifically, to cache indexing using data addresses based on data fingerprints.

Cache storage is a physical memory space used to temporarily store data to serve read and write data operations to provide high performance Data is stored in a cache as a result of earlier operations as an intermediary to backend storage, such as disk storage. Data access from the cache is faster than from the backend storage and data is stored in the cache whilst it is being stored to the backend storage either with write-through or write-back operations.

Cache sharding is a method for allocating data items to nodes of a distributed cache system based on a hash function computed on an item identifier. Sharding horizontally scales a cache system to address processing and storage capacity. A set of data items is partitioned into "shards" based on a result of a hash function computed on an identifier of the data item. Each shard is then mapped to a caching device to partition data across members of a cluster and to identify the member of the cluster responsible for a given data item by computing the hash function.

The identifier used in known cache sharding is traditionally a customer identifier or host identifier such as an Internet Protocol address, or some other resource identifier such as the central processing unit (CPU) or CPU core identifier. The typical purpose of this is to be able to spread the workload over many resources, such as CPU, particularly in scenarios such as where very few logical volumes are in use, as the system is still utilizing all the resources available and is not bottlenecked on a single resource despite a single logical volume is in use.

Cache deduplication is a known method for reducing copies of data blocks stored in a cache in order to reduce cache usage and storage capacity requirements. Deduplication operates at a block level reducing duplicate data blocks and storing a source data block to which other data blocks are mapped. When data is written to a cache, a deduplication service scans the incoming blocks, creates a fingerprint using a hash function, and stores the fingerprint in a deduplication metadata in the form of a hash store in-memory data structure. Large scale cache deduplication with 100% data coverage is costly due to the size of data structures for the deduplication metadata that would be needed and the time taken to search them.

Traditional lookup to a cache uses a virtual address or logical block address (LBA) mapping to a cache address. This means that data is cached and accessible for a specific logical address. This limits the cache access to the specific logical address defined in a software layer and to a single host accessing the cached data.

The problem presented by the current state of the art is that with traditional LBA addressing, multiple instances of caches are required as the read/write's traverse the various layers within the storage subsystem. Each layer represents a different context within the system each with their own index. This occupies a considerable amount of resource and duplication of effort to manage multiple caches.

SUMMARY

According to an aspect of the present invention there is provided a cache storage system indexing method comprising: indexing a data address in a cache storage system based on a data fingerprint of the cached data, wherein the data fingerprint is generated by a deduplication fingerprint function used for referencing deduplication of data in the cache storage system.

The deduplication fingerprint for a piece of data provides a uniform way of indexing a data segment that is independent of the context that placed the data in the cache service and enables the cache service to be shared across all logical addressing schemes used at different layers in storage in a storage controller for speeding up reads. This method provides for faster average reads with a more unified cache service while maintaining existing separation on traditionally addressed cache-writes.

Indexing a data address may be based on a subset of the data fingerprint as a reference into an array that stores cache addresses in a cache address space of the cache storage system. In one embodiment, the subset of the data fingerprint obtains as an absolute middle subset of a defined number of bytes of the data fingerprint modulo a size of the array.

The data fingerprint may be obtained for read operations from deduplication metadata that maps different address aliases from different software logical layers or different client domains to the deduplication data fingerprint. The cache indexing method may be used in addition to or as a replacement for an original cache addressing method.

The cache storage system may a single uniform cache for read/write operations at multiple layers of a storage subsystem, and wherein the indexing provides a uniform indexing across the multiple layers.

The cache storage system may be a sharded cache with sharding based on the data fingerprints generated by the deduplication fingerprint function.

According to another aspect of the present invention there is provided a computer-implemented method of data operations to a cache storage system, comprising: obtaining a data fingerprint for data of a data operation, either by applying a deduplication fingerprinting function to data of a write operation or by accessing deduplication metadata for a read operation, to obtain the data fingerprint generated by using a deduplication fingerprinting function used for deduplication of data in the cache storage system; and using an indexing service to the cache storage system having an address schema based on the data fingerprints of the data.

The indexing service may use a reference based on a subset of a data fingerprint as an address into an array that stores cache addresses in a cache address space of the cache storage system.

When the data operation is a write operation, the method may include: receiving a data write operation; calculating a data fingerprint of the data to be written using a fingerprint function used for deduplication of data in the cache storage system; creating a cache entry for the write data; and using the data fingerprint to address the cache entry in the cache storage system.

When the data operation is a read operation, the method may include: receiving a data read operation with a logical address for the data; obtaining a data fingerprint of the data to be read from deduplication metadata by referencing the logical address; and using the data fingerprint to address data in the cache storage system to attempt to read the data.

Obtaining a data fingerprint may be carried out after a cache miss using an original addressing scheme of the cache storage system when a read operation comes down to a deduplication layer as it could not be serviced using a logical address. Obtaining a data fingerprint and using the data fingerprint to address data may be carried out prior to or in parallel with an original addressing scheme.

The method may include allowing false hits of the cache storage system using the data fingerprint to address the data; and verifying the data fingerprint with the data fingerprint of retrieved data.

The method may include using a subset of the data fingerprint as an address into an array storing cache addresses; and verifying the data fingerprint with the data fingerprint of retrieved data.

The method may further include: discovering multiple references to a data source by use of the data fingerprint addressing; and unifying the references to a data source thereby increasing the deduplication.

As a read operation moves through the software layers, the method may record address aliases of results in address transformations to reference a same data segment, and may associate address aliases with a data fingerprint.

According to another aspect of the present invention there is provided a cache storage system comprising: a cache storage system indexing system including: an array that stores cache addresses into a shared cache address space, the array having references based on a data fingerprint of the cached data, wherein the data fingerprint is generated by a deduplication fingerprint function used for deduplication of data in the cache storage system.

The cache storage system indexing system may include a data fingerprint obtaining component for obtaining deduplication data fingerprints when carrying out read and write operations to the cache storage system. The data fingerprint obtaining component may include: a read operation component for obtaining the data fingerprint for read operations from the deduplication metadata, wherein the deduplication metadata maps address aliases from different software logical layers or different client domains to the deduplication data fingerprint; and a write operation component for applying a deduplication fingerprinting function to data of a write operation.

The cache storage system may a single uniform cache for read/write operations at multiple layers of a storage subsystem, and wherein the cache storage system indexing system provides a uniform indexing across the multiple layers. The cache storage system may be a sharded cache with sharding based on the data fingerprints generated by the deduplication fingerprint function.

According to another aspect of the present invention there is provided a cache storage system indexing system, comprising: a data fingerprint obtaining component for obtaining a data fingerprint for data of a data operation, either by applying a deduplication fingerprinting function to data of a write operation or by accessing deduplication metadata for a read operation to obtain the data fingerprint generated by using a deduplication fingerprinting function used for deduplication of data in the cache storage system; and an array lookup component for obtaining a cache address for the data of the data operation to the cache storage system by using a reference based on the data fingerprint of the data.

The cache storage system indexing system may include a write operation component for: receiving a data write operation; calculating a data fingerprint of the data to be written using a fingerprint function used for deduplication of data in the cache storage system; creating a cache entry for the write data; and using the data fingerprint to address the cache entry in the cache storage system.

The cache storage system indexing system may include a read operation component for: receiving a data read operation with a logical address for the data; obtaining a data fingerprint of the data to be read from deduplication metadata by referencing the logical address; and using the data fingerprint to address data in the cache storage system to attempt to read the data.

The cache storage system indexing system may include a hit verifying component for verifying the data fingerprint with the data fingerprint of retrieved data.

The cache storage system indexing system may including a reference unifying component for discovering multiple references to a data source by use of the data fingerprint addressing and unifying the references to a data source thereby increasing the deduplication.

According to a further aspect of the present invention there is provided a cache storage system sharded using a data fingerprint address as a shard key, where the data fingerprint address is an address based on a data fingerprint obtaining using a deduplication fingerprint function used for deduplication of data in the cache storage system.

This has the advantage of providing equal and fair distribution of responsibility of fingerprints across various resources in the system (e.g. CPU cores), so that on average the various resources process fingerprints equally, and there is minimal risk of skew. This also helps segment the cache in error scenarios.

According to a further aspect of the present invention there is provided computer program product for indexing a cache storage system, the computer program product comprising a computer readable storage medium having program instructions embodied therewith, the program instructions executable by a processor to cause the processor to: obtain a data fingerprint for data of a data operation, either by applying a deduplication fingerprinting function to data of a write operation or by accessing deduplication metadata for a read operation to obtain the data fingerprint generated by using a deduplication fingerprinting function used for deduplication of data in the cache storage system; and use an indexing service to the cache storage system having an address schema based on the data fingerprints of the data.

The computer readable storage medium may be a non-transitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

Figure 1A:
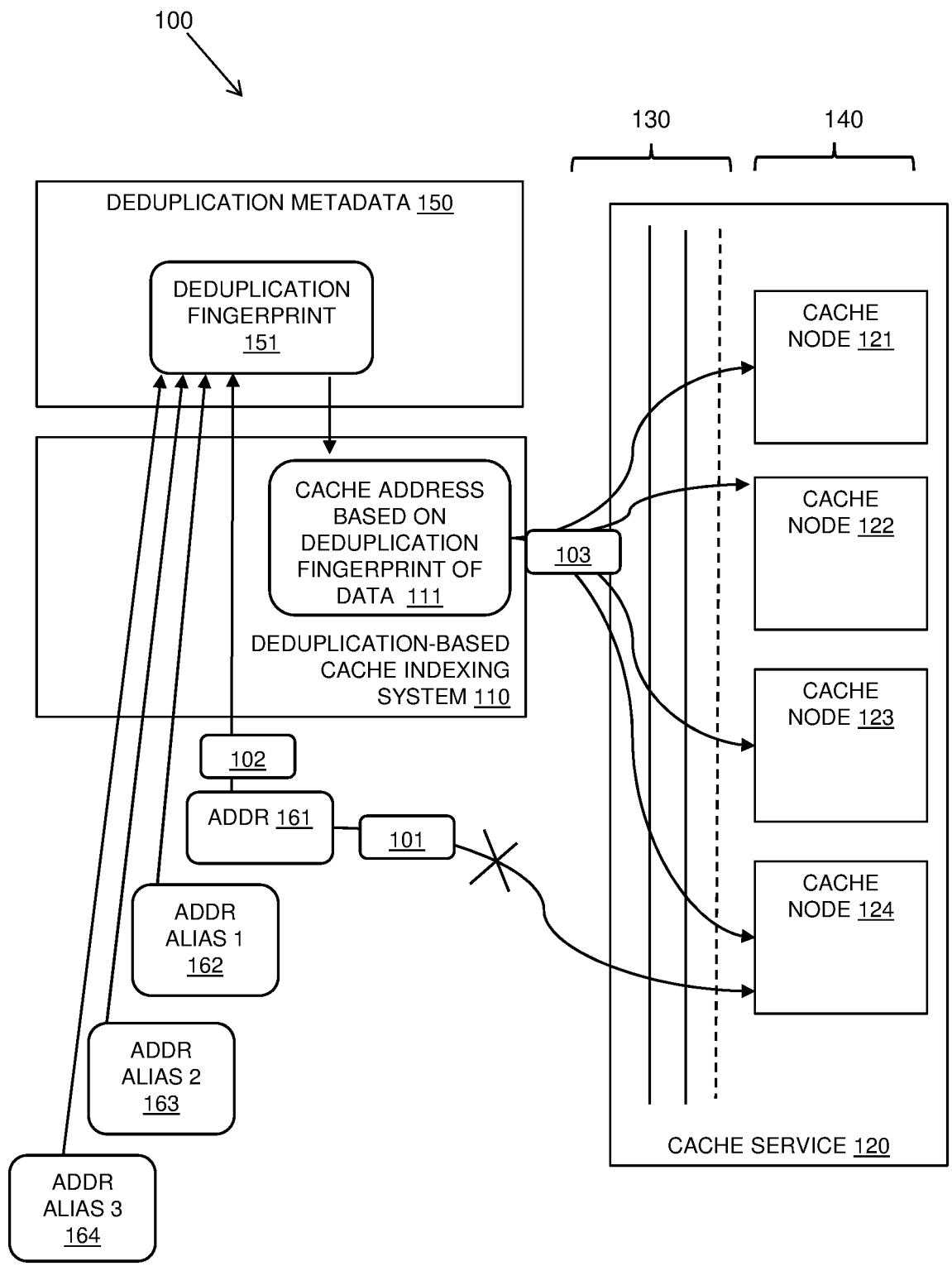
FIGS. 1A and 1B are schematic diagram example embodiments of a caching system including a caching indexing system in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A method and system are described that provide an indexing method for a unified cache address scheme based on the data fingerprint generated by a hash function that is used for deduplication referencing of the data. Given deduplication is becoming an increasingly common feature in storage systems, utilizing the deduplication metadata to create a single uniform cache for multiple layers, significantly optimizes the storage system by reducing the cache to a single instance. Sharding of the cache may also be based on the deduplication fingerprint.

The term "deduplication fingerprint" is used to refer to a hash obtained from a hash function that is used for deduplication of data. This distinguishes the deduplication hash from the hash of an identifier used in known cache sharding.

The described method and system may cache data to feed and exploit a mechanism that combines data addressed from different software logical layers and different client domains, perhaps accessed using different addressing schemes and namespaces, into a unified cache address scheme based on a common fingerprinting function. The deduplication fingerprint, which is calculated for writes and retrieved from deduplication metadata for reads, is used to address the cache service as a common cache service that unifies client domains. The cache service may be partitioned into shards based on the deduplication fingerprint. This may be used in combination with the cache indexing and addressing using the deduplication fingerprint or independently.

Deduplication is a well-known technique that is used for removing duplications from stored blocks of data by pointing to a stored block using deduplication metadata. The deduplication process begins by creating a unique digital fingerprint or signature (often referred to as a hash) for a given block of data by applying a hash function. This fingerprint value is saved in a fingerprint database or hash store so it can be compared to fingerprint values that are created for new incoming data blocks. By comparing fingerprint values, it is determined if a block of data is unique or a duplicate of an already stored data block. Deduplication metadata provides mappings from the deduplication fingerprints to the address of the stored data blocks. The deduplication fingerprint values are used in the described indexing method and system for data cache services.

In the described method, a deduplication fingerprint is used to map to a cache addresses to see if that data exists in cache. This may be used independently or as an alternative or additional form to traditional lookup using a virtual address or logical block address (LBA) mapping to a cache address.

The cache may also be sharded by the deduplication fingerprint for cache partitioning purposes. Sharding data by partitioning it into different subsets based on the deduplication fingerprint and deduplicating these at different logical or physical locations improves coverage and cost balance. For example, if the cache is partitioned by a backend storage controller, a failure on one controller will not impact or take resources away from other cache partitions. The sharding allows for equal and fair distribution of responsibility of fingerprints across various resources in the system (for example, CPU cores), so that on average the various resources process fingerprints equally, and there is minimal risk of skew.

The indexing method may be used for any cache implementation where a cache service is required for multiple users that require a cache so they can all share the same service. Since they all share the cache, the users can all benefit from each other's data.

This may be implemented in any area where there is a cache service and a deduplication technology. This may be in the physical drive, storage controller, or may be in the host servers themselves.

The described method and system improve the read cache hit rate by combining a greater number of cache users' data in the cache, equally or more relevant due to cache sharding. This can produce a read 'cache hit' for data that has not recently, or perhaps ever, been read or written using the address that is used in the read operation.

The addressing scheme may be used independently or in parallel with an original addressing scheme. If a cache miss occurs using the read operation's original addressing scheme, the deduplication metadata is used to resolve the data's stored deduplication fingerprint, without reading the actual user data, and that deduplication fingerprint is then used to address the unified cache.

Referring to FIG. 1A, a schematic diagram 100 shows an example embodiment of the described system of a cache indexing system 110 for a cache service 120. The cache service 120 may be sharded 140 and may include multiple cache nodes 121-124.

The described deduplication-based cache indexing system 110 references deduplication metadata 150 for the cache service 120 and uses the deduplication fingerprints 151 of data being read or written as a basis for cache addresses 111 and, optionally, also for sharding 130 the cache service 120.

It should be noted that the cache service 120 is not being deduplicated in the described system and method. Deduplication of the cache may be carried out by another service and a typical deduplicated cache would have an indexing means for looking up a source address for deduplicated data during write operations. The deduplication metadata 150 provided by such a deduplication service is referenced by the described system and method.

The deduplication-based cache indexing system 110 indexes from a deduplication fingerprint 151 to a cache entry. As mentioned above, a typical deduplicated cache would have an indexing means for looking up a source address for deduplicated data during write operations; however, this would not operate the addressing described here which is applicable to both write and read operations. The described cache makes use of the described indexing on reads using indexing from a deduplication fingerprint 151 to a cache entry and adds cache entries for the deduplication fingerprint 151 on writes.

The described read indexing may be used to perform a primary addressing function. Alternatively, it may be used to perform a secondary "double-take" on the cache service 120 by mapping an original addressing scheme, that may be a conventional addressing scheme, to the deduplication-based addressing scheme.

The secondary addressing method is illustrated in FIG. 1A, with a conventional address shown as "Addr" 161, which receives a "cache-miss" 101 from the cache service 120. The conventional address 161 is used to look up 102 the deduplication metadata 151 to resolve the deduplication fingerprint 151 of the data without obtaining the data contents. This in turn is used by the cache indexing system 110 to obtain the cache address 111 based on the deduplication fingerprint and perform the secondary pass 103 on the cached data.

During reads, the fact that the deduplication fingerprint 151 for a piece of data provides a uniform way of indexing a data segment that is independent of the context that placed the data in the cache service 120, enables the cache service 120 to be shared across all logical addressing schemes used at different layers in storage in a storage controller for speeding up reads. This is illustrated by address aliases 162-164 of the conventional address "Addr" 161 that may alternatively be used to look up the deduplication metadata 150 to obtain the deduplication fingerprint 151.

In the primary addressing method, the cache-miss step 101 is not carried out and the deduplication fingerprint address 111 is used as a primary address for the cache service 120.

Figure 1B:
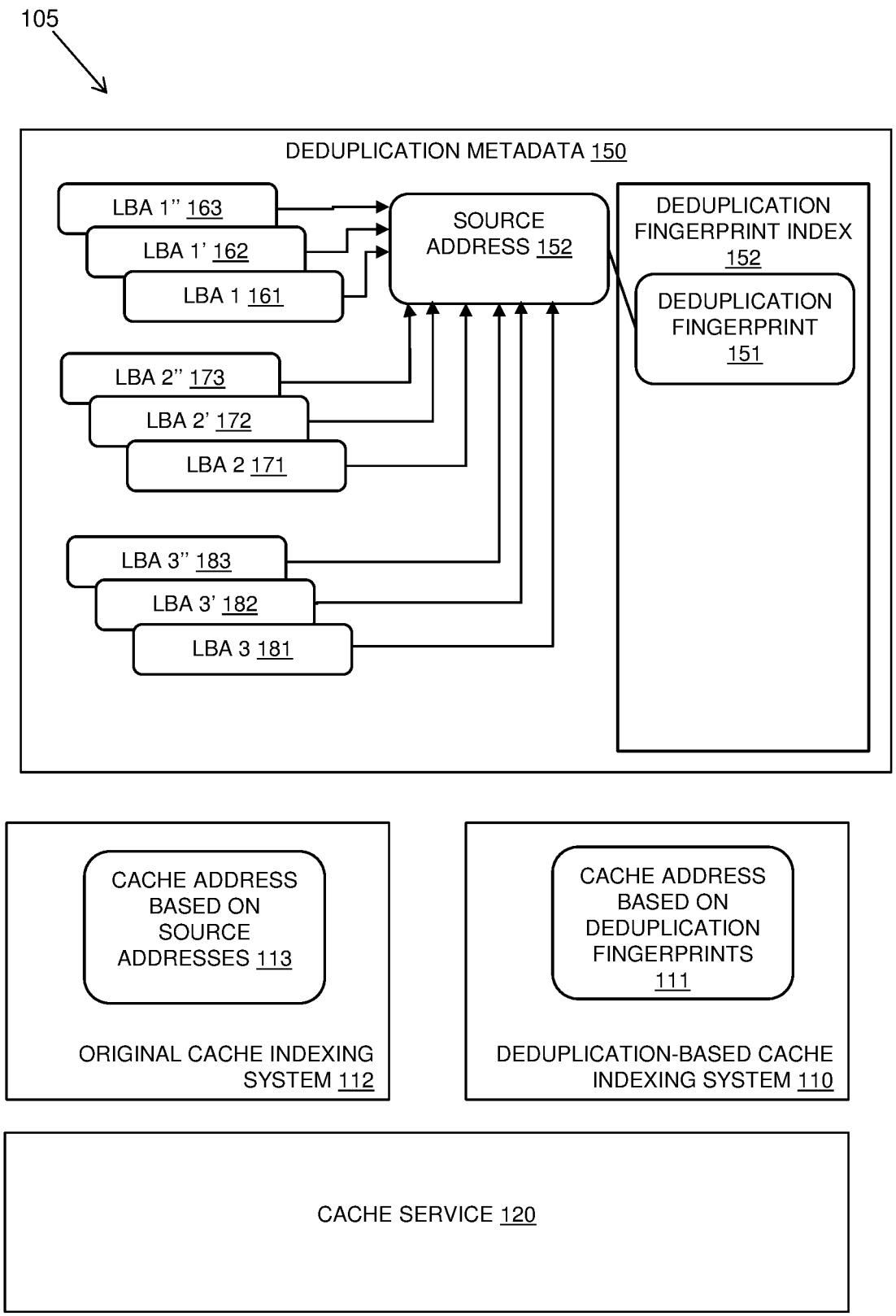

Referring to FIG. 1B, a schematic diagram 105 shows an example embodiment with further details of the mappings provided by the deduplication metadata 150. For deduplication of data writes, deduplication metadata 150 is stored including an index 152 of deduplication fingerprints 151 generated by a hashing function for each block of data. The deduplication metadata 150 also includes a many to one mapping of logical addresses 161, 171, 181 to a source address 152, wherein the logical addresses 161, 171, 181 are for data blocks that are duplications of a data block stored at the source address 152. The logical addresses may use logical addresses 161-163, 171-173, 181-183 of logical addressing schemes used at different software layers.

In the described method and system, the deduplication-based cache indexing system 110 uses the deduplication metadata 150 to map a logical address 161-163, 171-173, 181-183 for a read operation to a deduplication fingerprint 151 used to address 111 the cache service 120. This deduplication-based cache indexing may be independent to or used in parallel with an original cache indexing system 112 that uses a cache addressing scheme 113 based on source addresses 152.

Figure 2A:
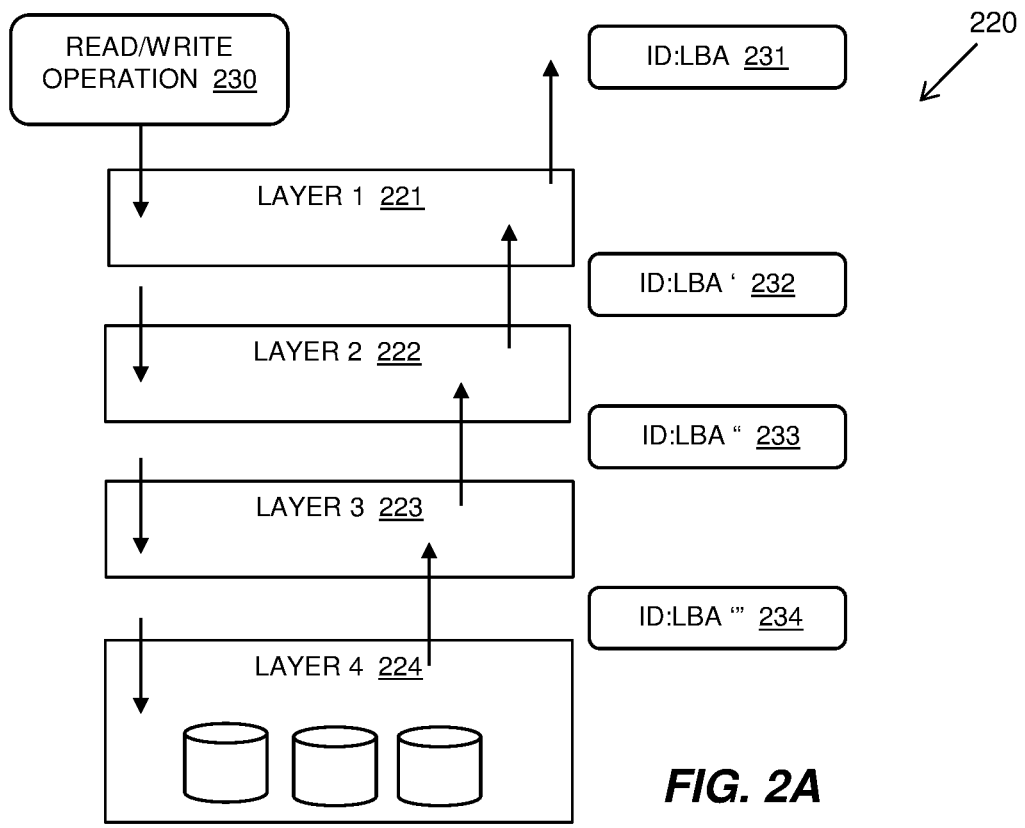
FIG. 2A is a schematic diagram illustrating software layer addresses as used in accordance with the present invention.

FIG. 2A shows a schematic diagram 220 of different software layers 221-224. An example embodiment may be that: Layer 1 221 is an Upper Cache, Layer 2 222 is a Deduplication Layer, Layer 3 223 is a Lower Cache, and Layer 4 224 is a RAID Layer. Each layer is optional and an IO operation may flow bypassing that layer to the immediate layer below. In some embodiments, there may be more layers between Layer 1 221 and Layer 2 222; for example, an additional layer may be a replication service to do volume mirroring, and another additional layer may be a point in time copy service to provide a point in time snapshot service. Additionally, Layer 4 224 may include a virtualization layer where there are multiple RAID arrays all being virtualized to the same host volumes. The RAID layer itself may contain a cache, for example, to manage RAID parity.

A read/write operation 230 flows through the layers, where some layers are optional and a read/write operation 230 may flow bypassing that layer to the immediate layer below. All the layers may need access to the described cache indexing service. As a read or write operation 230 moves through the software layers 221-224, if computation results in address transformation from an original address 231 to reference the same data segment, selected address 'aliases' 232-234 remain associated with the operation 230.

When the deduplication layer's metadata stores the relevant deduplication fingerprint for an address 231, the address aliases 232-234 can additionally be associated with the deduplication fingerprint and used for its subsequent retrieval.

After the lower level deduplication layer's metadata has resolved the deduplication fingerprint 151, without yet obtaining the data contents, the deduplication fingerprint 151 can then be used to access the deduplication-based cache indexing system 110 into the totality of the cache's contents.

Figure 2B:
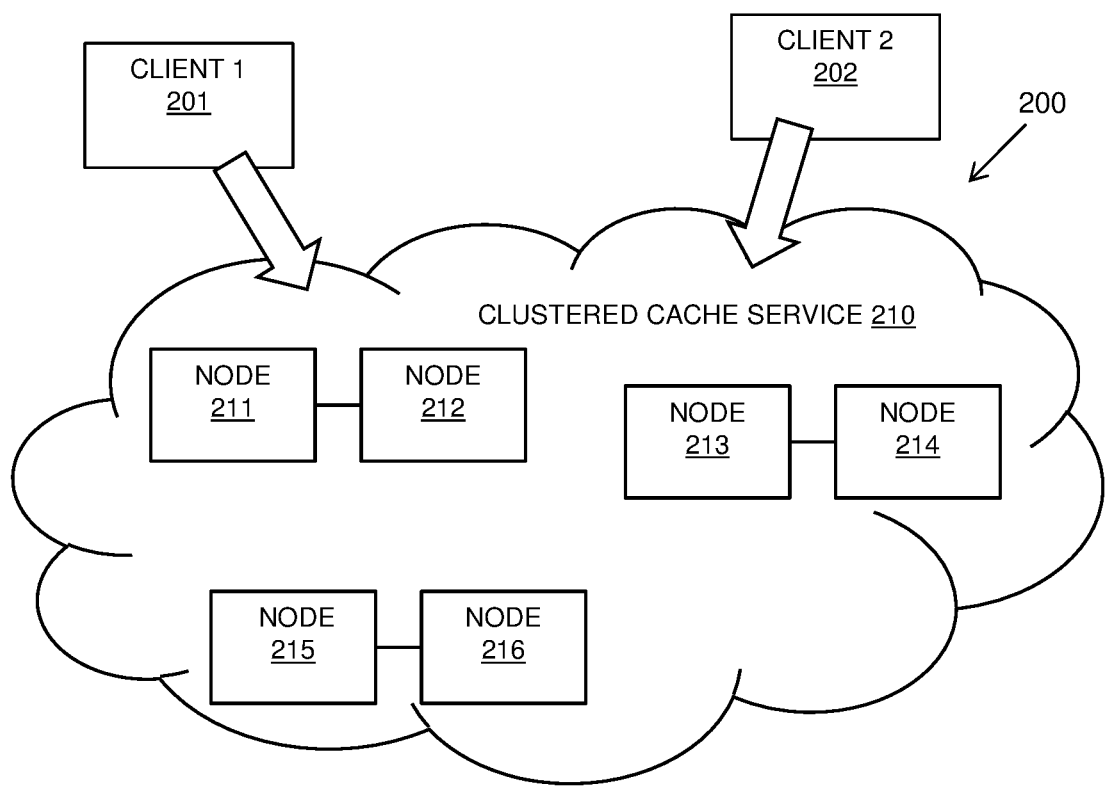
FIG. 2B is a schematic diagram of a clustered storage controller as used in implementations of a system in accordance with the present invention.

FIG. 2B shows a schematic diagram 200 of a clustered cache service 210 of nodes 211-216 with client computers 201 and 202 accessing the storage. Nodes 211-216 are provided in pairs to give high availability. Clustering can increase the availability of a cache service; if a node fails, the remainder of the cache is still accessible. Clustering is frequently used in conjunction with replication and failover. Each node can be replicated, and the replica can be quickly brought online if the node fails.

Indexing the cache from the deduplication fingerprint of the data sought is aided by attributes of the fingerprint. Deduplication fingerprints, such as SHA hashcodes, are randomly distributed making them an excellent basis for extremely fast hash-maps and this is true for any subset of the WA's bits. This means that an indexing method may truncate or select a subset of the SHA and use it an address into an array that stores cache addresses (or null) into the shared cache address space.

In an example implementation, the following indexing and addressing based on the deduplication fingerprint may be used. A typical deduplication fingerprint maybe a Secure Hash Algorithm 1 (SHA-1) 20-byte hash. There are other SHA schemes such as SHA-2 but these have much larger hashes. Creating a table using 20 bytes of hash would create a very large table index and therefore would consume a high level of resources. Therefore, a subset of the bytes of the deduplication fingerprint may be used to create the indexing table.

An example embodiment may use the middle 6 bytes of the hash and create an indexing table using those 6 bytes. The following sum may be carried out and then the resultant value used to represent the hash entry in the cache indexing table: ((Absolute middle 6 bytes of hash) modulo (the chosen size of the table)), where modulo means divide X by Y, and then take the remainder of that sum.

For example, if the middle 6 bytes of the finger print represents: 0x123456 and the size of the table is 0x10000 entries. Then the table entry of the cache index would be: 0x123456% 0x10000=0x3456.

This method gives a random distribution of the deduplication fingerprints over the cache indexing table.

This is just one example embodiment and another example may take the middle 6 bytes of the 20-byte fingerprint hash and the create a tree (instead of a table) of those hashes.

Another useful attribute of the deduplication fingerprint when indexing the cache from the deduplication fingerprint is that the indexing can be allowed to return false 'hits' as there is fast hardware support for calculating the SHA for the data the hash-map points to in order to check it matches exactly. As there may be multiple entries on the same hash chain within the cache indexing table, the full hash is required to determine which entry to use on the chain of partial hashes.

This is explained further using the example implementation of the using the middle 6 bytes of a 20-byte hash. A 20-byte hash provides a greater degree of accuracy on the data compared to a 6-byte hash and with a 6-byte hash there may be hash collisions. (i.e. two sets of different data with the same 6-byte hash). Therefore, using the full 20-byte hash may be required to make sure the correct set of data is returned.

Using the middle 6 bytes may also be used to cut down the deduplication metadata size by only storing a partial hint. The full hash is stored, but there is a deduplication metadata cache for fast look up of the deduplication metadata.

Figure 3:
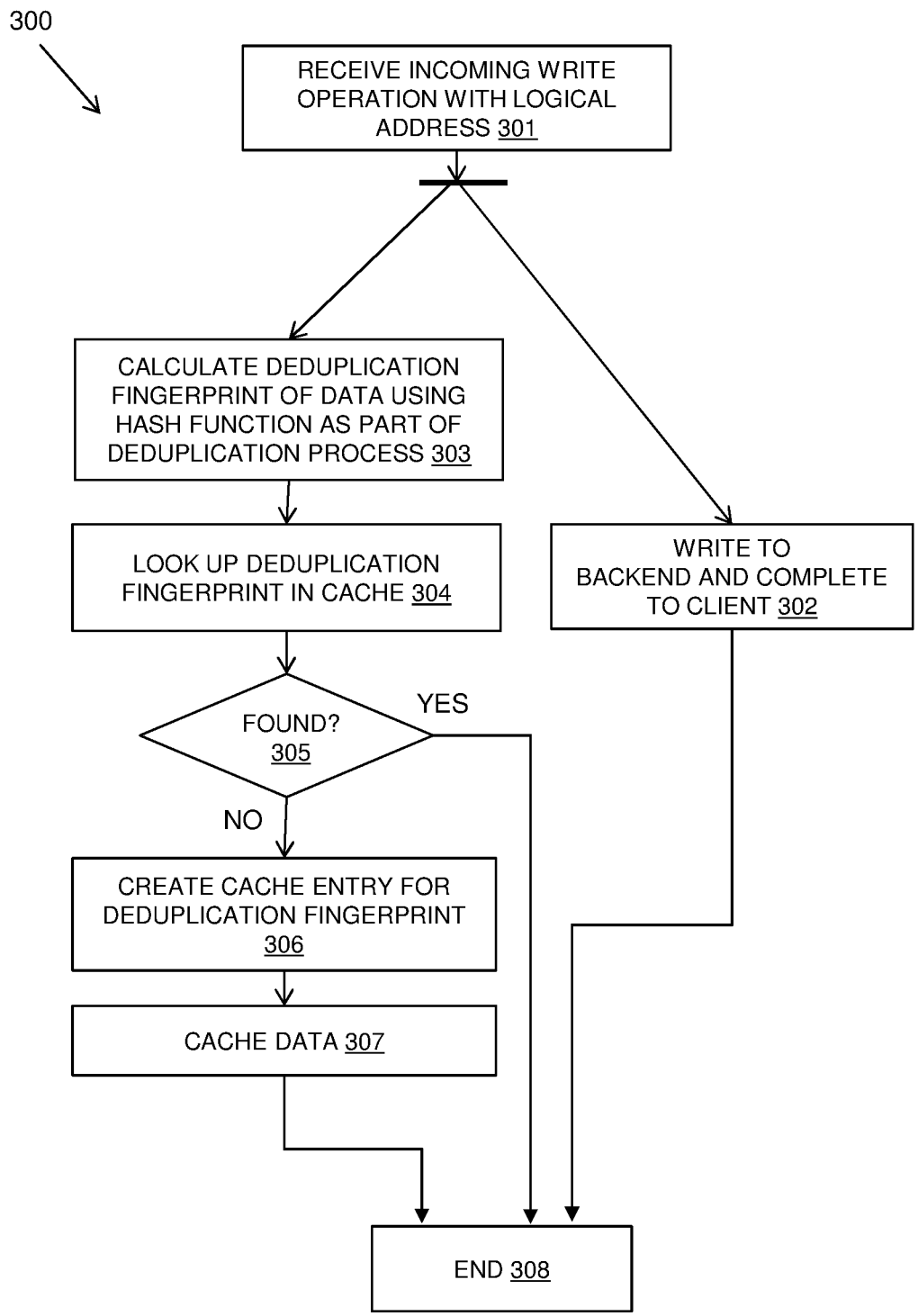
FIG. 3 is a flow diagram of an example embodiment of an aspect of a method of a write operation in accordance with the present invention.

Referring to FIG. 3, a flow diagram 300 shows an example embodiment of a method of cache indexing based on deduplication fingerprints during a write operation.

An incoming write operation is received 301 having a logical address for the data. The method may branch to carry out the write to the backend and to complete the write to the client 302 and that method branch may end 308.

In parallel to the write to the client, a branch may cache the write data. The cache write operation may include calculating 303 the deduplication fingerprint of the data using the hash function as part of the deduplication write process. Typically, data write operations obtain the data's deduplication fingerprint (also referred to as the hashcode or SHA) as writes have the data to hash, and the write operation subsequently uses the fingerprint to find duplicates. Data writes then create and maintain metadata for the duplicates they have found as many-to-one, reference-to-source, links that can be used for subsequent reading and writing of a shared source for the data.

The caching branch may look up 304 the deduplication fingerprint for the data in the cache. If the deduplication fingerprint is found 305 in the cache, no action is taken and the branch may end 308. The deduplication fingerprint match ensures that the data being written is the same as the cached data. This may be verified if the lookup is carried out on a sub-set of the deduplication fingerprint.

However, if the deduplication fingerprint is not found in the cache, a cache entry is created 306 for the deduplication fingerprint and the data is cached 307, and the method branch may end 308.

Figure 4A:
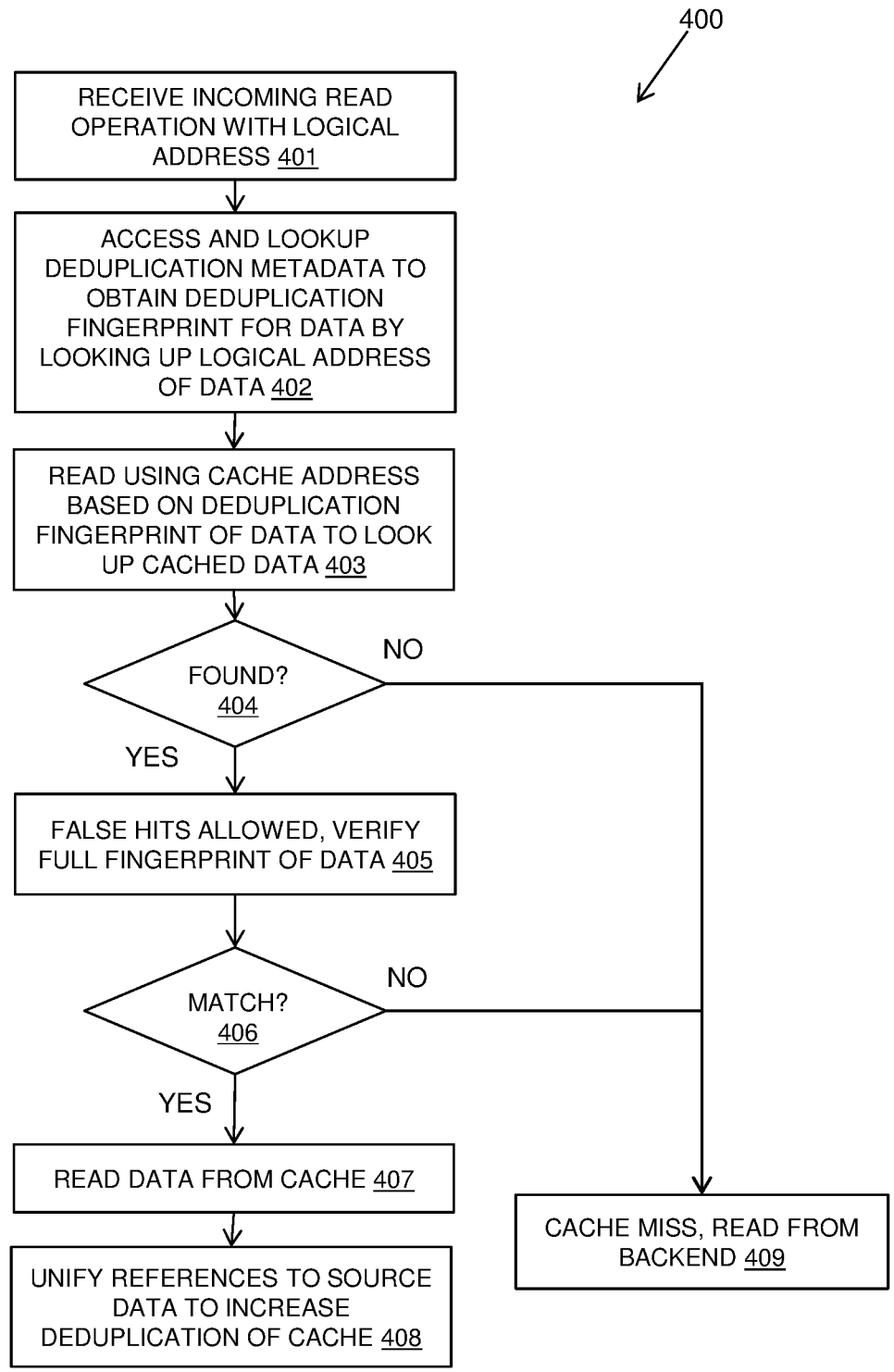
FIG. 4A is a flow diagram of an example embodiment of another aspect of a method of a read operation in accordance with the present invention.

Referring to FIG. 4A, a flow diagram 400 shows an example embodiment of a method of cache indexing based on deduplication fingerprints during a read operation.

An incoming read operation is received 401 having a logical address for the data. The logical address may be a logical address of a logical addressing scheme used at one of the software layers.

Typical data reads do not already know the requested data's contents, so they cannot calculate the relevant deduplication fingerprint. Data reads use a logical address which is processed to map to a physical (i.e. next layer down) address, either the equivalent of the address used for non-deduplicated data or translated to a shared source's address for deduplicated data.

The described method may access and lookup 402 deduplication metadata that is maintained for deduplication of data. The lookup 402 obtains a deduplication fingerprint that is indexed in the deduplication metadata for the data of the logical address.

As mentioned earlier, the deduplication metadata will typically store the deduplication fingerprint for a data segment for the use of write operations but this is not conventionally used in reads (apart from, in some schemes, as an additional data verification). The described method makes use of the fact that when a read accesses the deduplication metadata to obtain the physical address it can additionally obtain the deduplication fingerprint for the data it wants to read. This provides an address translation from a read LBA address to the data content's deduplication fingerprint using backing store deduplication metadata. This uses the deduplication metadata to obtain the deduplication fingerprint for data that is being requested before the data itself is retrieved in the read operation. Deduplication metadata is often stored in memory or in a faster storage tier and is being looked-up anyway to perform the physical address determination.

A cache service is read 403 using an indexing method in which a cache address is based on the deduplication fingerprint. The indexing method may truncate or select a subset of the deduplication fingerprint and use it an address into an array that stores cache addresses (or null) into the shared cache address space.

It is determined 404 if there is a cache hit and the data is found. If it is not found, there is a cache miss 409 and the data may be read from a backend storage. If a subset of the deduplication fingerprint is used as the address false hits are allowed and the full deduplication fingerprint may be used as a verification 405 of the correct location of the cached data for the read.

It is determined 406 if there is a verification match. If there is no match, there is a cache miss 409 and the data may be read from a backend storage. If there is a match, the data may be read 407 from the cache.

A hit in the form of a non-null entry in the cache's deduplication fingerprint to address map therefore may enable both the retrieving of the data from the cache, and also the discovery of another reference to the source. This may be used to additionally unify 408 two references to one source or even two sources each with multiple references thereby increasing the deduplication.

The deduplication metadata may indicate that there are two separate sources of the data. The most likely reason for this is that the deduplication domain scope did not cover the original search for the hash when the second write was written, and therefore did not discover the data was already stored. The described cache indexing scheme can increase the scope of the deduplication domain, and therefore discover new sources of data. This can effectively replace the second source write with a link to the first source write, resulting in a capacity saving from a user's perspective.

The described method may also allow increased data deduplication over existing schemes for either backend storage or cache deduplication. To illustrate this reference is made to FIG. 2A which describes a typical layered scheme of the various components of the system. Given IOs flow from top to bottom, it maybe that a component beneath the deduplication layer may be generating data that the deduplication layer is not exposed to. This is one reason why there may be improved deduplication capacity savings from this feature. For example, if there is a copy service layer or a snapshot layer (copying one volume to another) that is beneath the deduplication layer. The copy service layer will be generating new writes that are not exposed to by the deduplicating layer and therefore will result in increased capacity usage. With the described method, there will be a capacity saving from utilizing the cache as a source for identifying new duplicates.

The described indexing method adds another pathway to the read operation by noticing that deduplication is typically not 100% complete in the storage controller. Perfect deduplication would usually be too costly in terms of metadata size needed or performance of searching it but that improving the duplication rate is very desirable.

Deduplication reduces performance within the storage controller, depending on the IO workload particularly if there is a high percentage of duplicate data being written, the storage controller may choose to sacrifice capacity savings in favour of performance. For example, if there are many volumes writing the same data, there will be many parallel accesses to the deduplication metadata, this requires internal locking of that metadata as there will be frequent updates to that metadata blocks, this will impede performance. In some circumstances, the controller may choose to create an independent set of the same source data so that performance is not sacrificed. The controller can then re-unify the multiple sources of data into a single source, this can be done asynchronously to the main IO flow. The cache indexing scheme may be used re-consolidating multiple sources.

The ability to obtain the deduplication fingerprint is used as an additional or replacement index into the cache. In one embodiment, the read operation may only come down to the deduplication layer if it cannot be serviced using the logical address, from the cache layers above the deduplication layer. The IO operation may make a second request to the cache service using the deduplication fingerprint to request if data is in the cache that has the matching deduplication fingerprint.

Figure 4B:
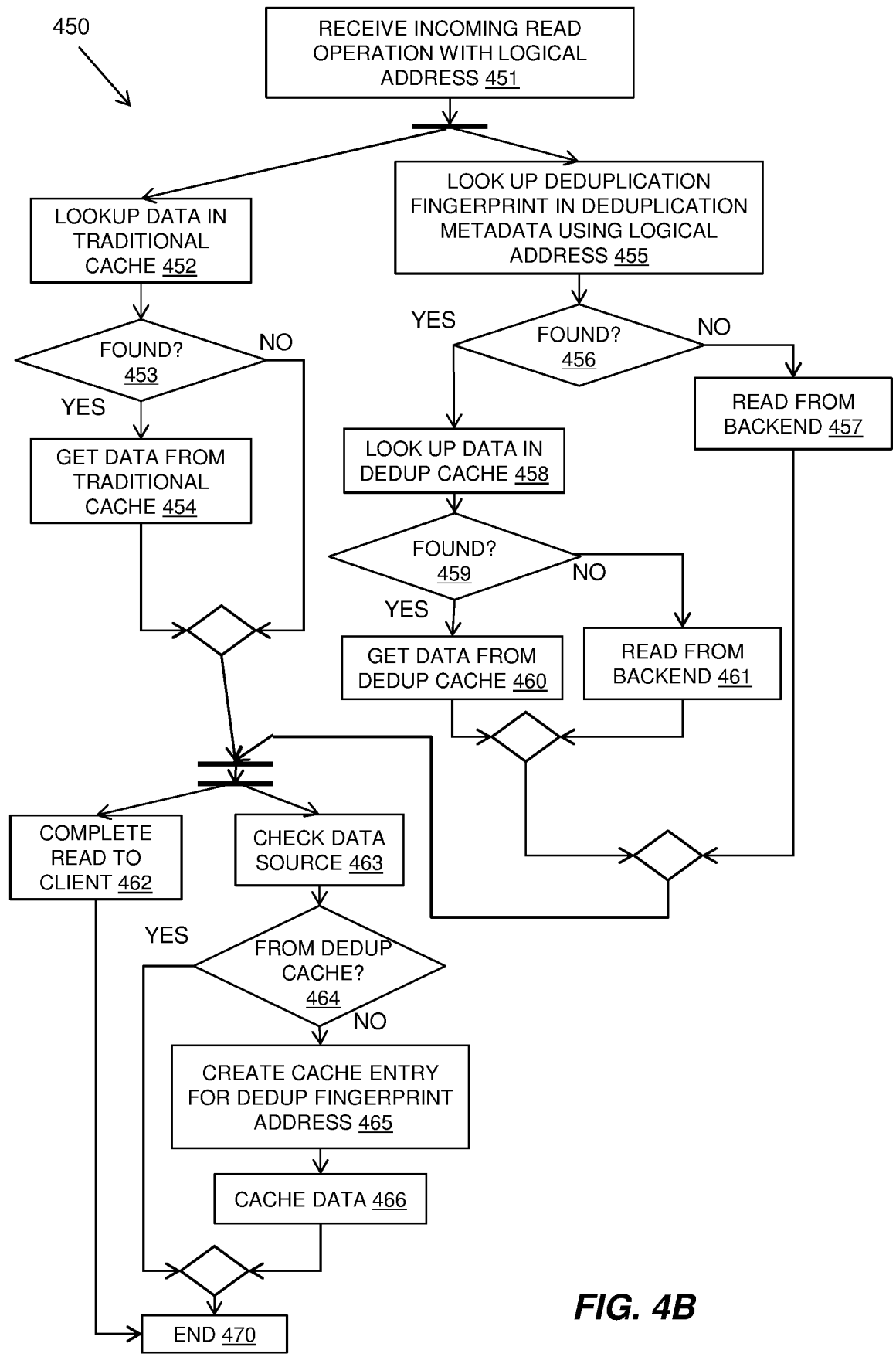
FIG. 4B is a flow diagram of another example embodiment of an aspect of a method of a read operation in accordance with the present invention.

Referring to FIG. 4B, a flow diagram 450 provides a more detailed example embodiment of a read operation.

An incoming read operation is received 451 with a logical address. A branch of the method may lookup 452 data in a traditional cache. If the data is found 453, the data can be retrieved 454 from the traditional cache, otherwise, there is a cache miss.

Another branch of the method may lookup 455 the deduplication fingerprint in deduplication metadata for the data read using the logical address of the data read. If a deduplication fingerprint is not found 456, the data may be read from the backend 457. If a deduplication fingerprint is found 456, the method may lookup 458 data in a deduplication-based cache and, if found 459, may get 460 the data from the deduplication-based cache. If the data is not found 459, the data may be read 461 from the backend.

This branch can either be operated prior to traditional read to the lower layer or backend devices to retrieve the data or in parallel. If it is carried out in parallel, this will not delay the read if the cache is a miss. If both searches are done in parallel, the traditional looking is faster, so the lookup in the deduplication metadata can then be aborted.

The method may complete 462 the read to the client in parallel with checking 463 the data source. If it is determined 464 that the data not being read from the deduplication cache, a deduplication cache data entry is created 465 based on the deduplication fingerprint address and the data is cached 466. Otherwise, the method ends 470.

Cache Sharding by Deduplication Fingerprint

Cache partitioning happens for two main reasons, partly as different layers and operations seek to use a cache but use different addressing schemes and also a cache is often partitioned to enable some level of isolation or bulkheading to prevent cache 'leaking' due to a degradation in performance of the subset of the lower storage media, such as when a slow drive causes reads that target it to back up in the cache.

Horizontal partitioning (often called sharding) is a strategy where each partition is a data store in its own right, but all partitions have the same schema. Each partition is known as a shard and holds a specific subset of the data.

A sharding scheme based on deduplication fingerprints allows a cache to be 'unified' across both dimensions for read operations where a deduplication fingerprint can be obtained faster than the data segment's contents. This, logically, increases the effective size of the cache used, albeit with some additional cost where the data is not cached under the addressing schemes used for this individual read.

The cache has a first horizontal dimension at a specific layer, using all the resources (such as partition and CPU core, or other resources) and a second vertical dimension at separate layers of the IO stack architecture. Therefore, other layers benefit from the cache. Typically, as IOs within a stack architecture only flow from top to bottom, (completions to IOs work their way back up the stack), a component of the IO stack will only benefit from the cache if it is beneath that layer. One benefit of the described indexing scheme is that all layers will benefit from the cache regardless of their position in the stack, because they can use the deduplication metadata and the fingerprint to do a hash look up.

Figure 5:
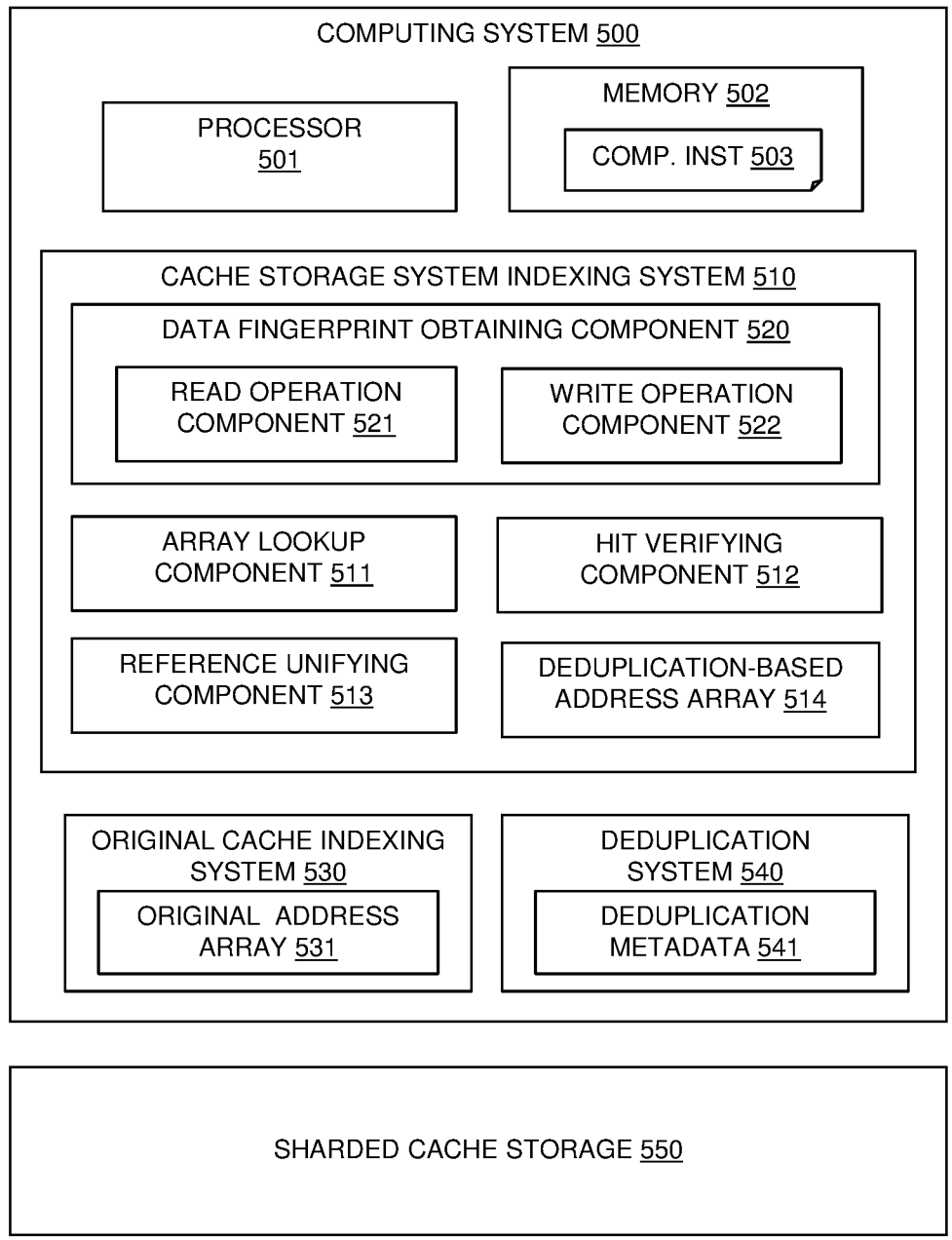
FIG. 5 is block diagram of an example embodiment of a system in accordance with the present invention.

Referring to FIG. 5, a block diagram shows an example embodiment of a computing system 500 as part of a storage system, that provides a cache storage system indexing system 510 in the form of a deduplication-based cache indexing system 110 for a cache storage 550.

The computing system 500 may include an original cache indexing system 530 for the cache storage 550 including an original address array 531. The original cache indexing system 530 may be used in parallel or consecutively with the deduplication-based cache indexing system 110.

The computer system 500 also includes a deduplication system 540 including stored deduplication metadata 541.

The cache storage 550 may optionally be sharded as described above with partitioning using a data fingerprint address as a shard key, where the data fingerprint address is an address based on a data fingerprint obtaining using a deduplication fingerprint function used for deduplication of data in the cache storage system.

The computing system 500 includes at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The cache storage system indexing system 510 includes a deduplication-based address array 514 that stores cache addresses into a shared cache address space, the array having references based on a data fingerprint of the cached data, where the data fingerprint is generated by a deduplication fingerprint function used for deduplication of data in the cache storage system.

The cache storage system indexing system 510 also includes a data fingerprint obtaining component 520 for obtaining deduplication data fingerprints when carrying out read and write operations to the cache storage 550.

The data fingerprint obtaining component 520 includes a read operation component 521 for obtaining the data fingerprint for read operations from the deduplication metadata 541 of the deduplication system 540, where the deduplication metadata 541 maps address aliases from different software logical layers or different client domains to the deduplication data fingerprints, and a write operation component 522 for applying a deduplication fingerprinting function to data of a write operation.

The cache storage system indexing system 510 includes an array lookup component 511 for looking up the deduplication-based address array 514 to obtain a cache address for the data of a data operation to the cache storage 550 by using a reference based on the data fingerprint of the data.

The cache storage system indexing system 510 may include a hit verifying component 512 for verifying the data fingerprint with the data fingerprint of retrieved data.

The cache storage system indexing system 510 may include a reference unifying component 513 for discovering multiple references to a data source by use of the data fingerprint addressing and unifying the references to a data source thereby increasing the deduplication.

Figure 6:
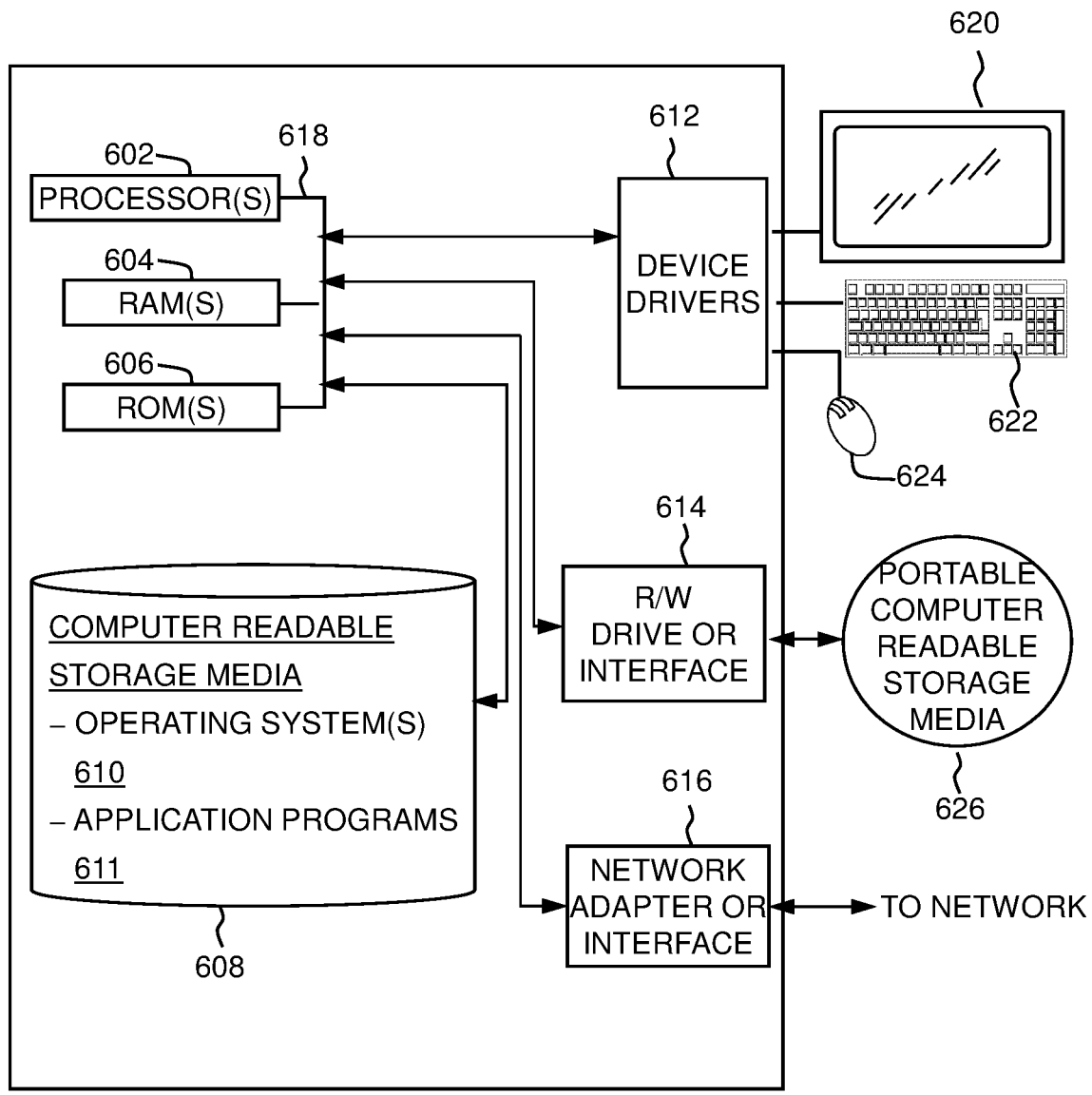
FIG. 6 is a block diagram of an embodiment of a computer system or cloud server in which the present invention may be implemented.

FIG. 6 depicts a block diagram of components of a computing system as used for the cache indexing system 110, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

The computing system can include one or more processors 602, one or more computer-readable RAMs 604, one or more computer-readable ROMs 606, one or more computer readable storage media 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within the system.

One or more operating systems 610, and application programs 611, are stored on one or more of the computer readable storage media 608 for execution by one or more of the processors 602 via one or more of the respective RAMs 604 (which typically include cache memory). In the illustrated embodiment, each of the computer readable storage media 608 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a R/W drive or interface 614 to read from and write to one or more portable computer readable storage media 626. Application programs 611 on the computing system can be stored on one or more of the portable computer readable storage media 626, read via the respective R/W drive or interface 614 and loaded into the respective computer readable storage media 608.

The computing system can also include a network adapter or interface 616, such as a TCP/IP adapter card or wireless communication adapter. Application programs 611 on the computing system can be downloaded to the computing device from an external computer or external storage device via a network (for example, the Internet, a local area network or other wide area networks or wireless networks) and network adapter or interface 616. From the network adapter or interface 616, the programs may be loaded into the computer readable storage media 608. The network may comprise copper wires, optical fibers, wireless transmission, routers, firewalls, switches, gateway computers and edge servers.

The computing system can also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614, and network adapter or interface 616 can comprise hardware and software stored in computer readable storage media 608 and/or ROM 606.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
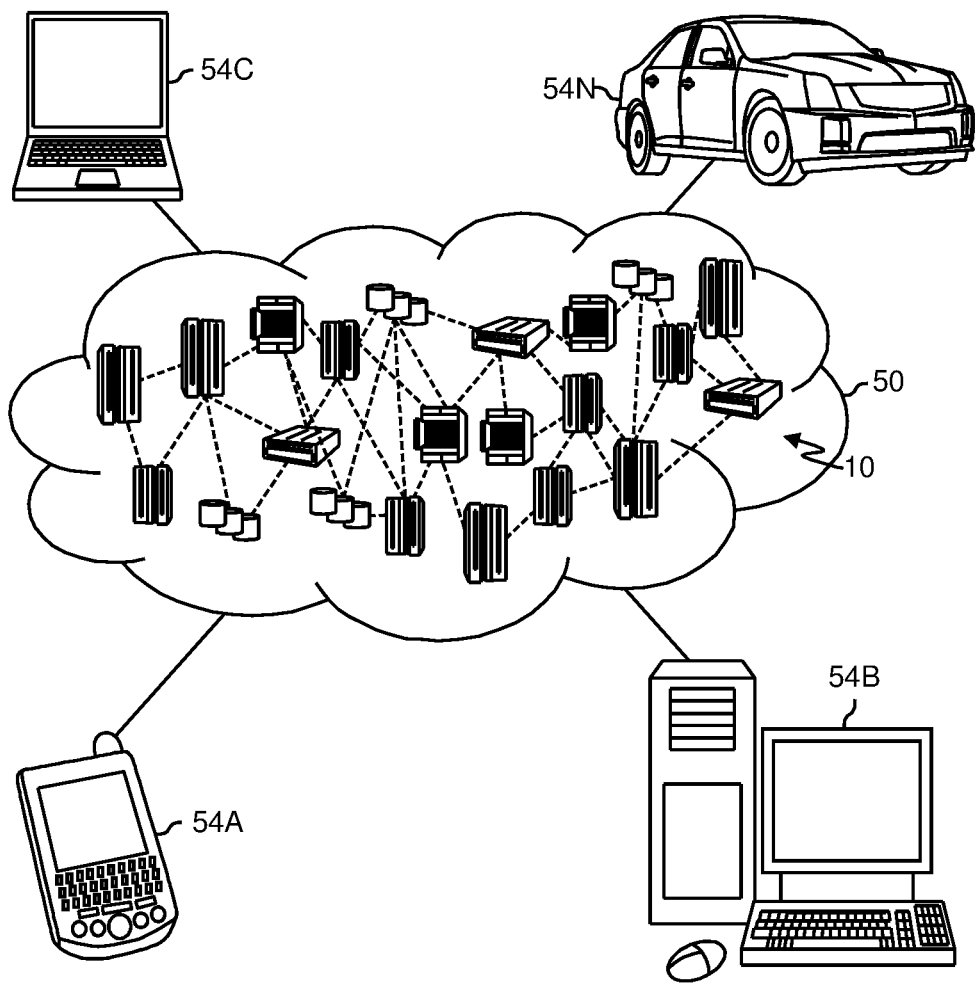
FIG. 7 is a schematic diagram of a cloud computing environment in which the present invention may be implemented.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
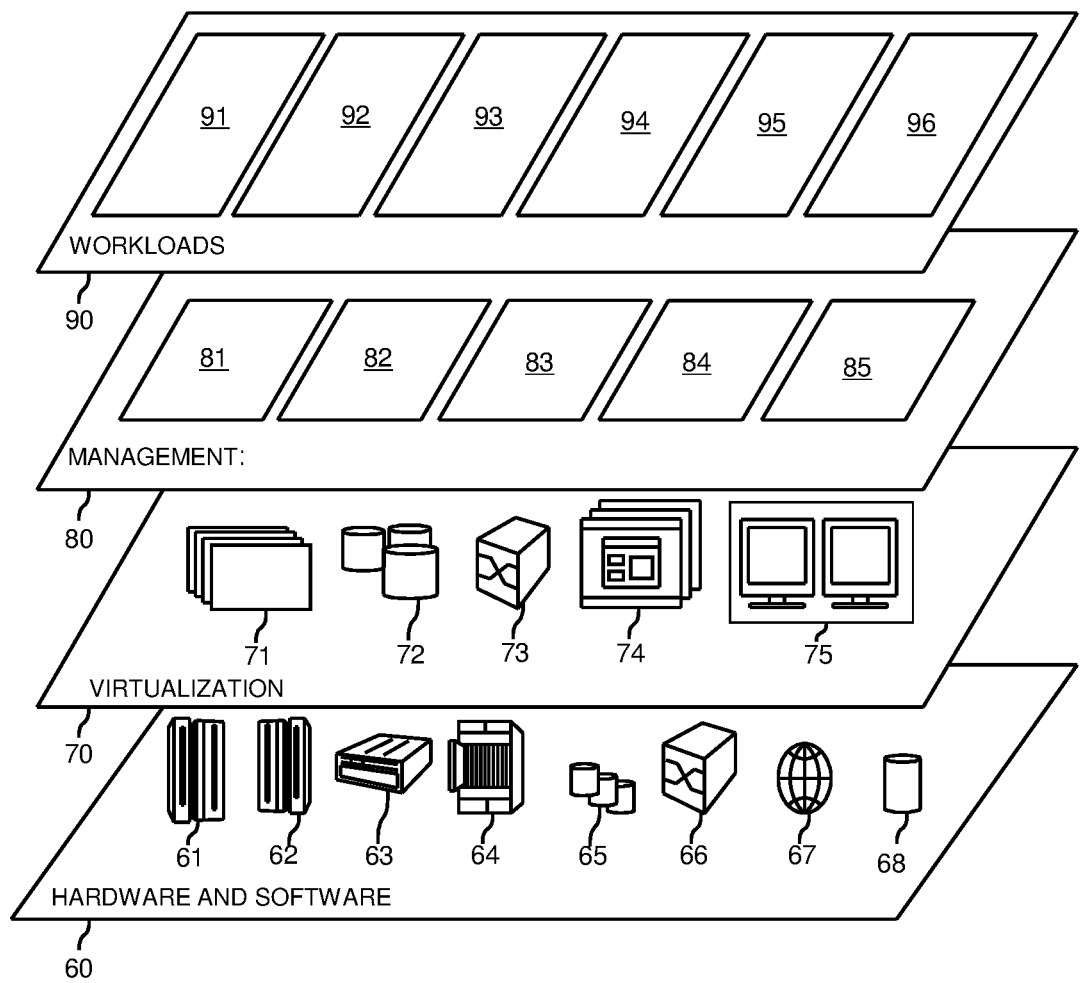
FIG. 8 is a diagram of abstraction model layers of a cloud computing environment in which the present invention may be implemented.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cache indexing processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for cache storage system indexing, the computer-implemented method comprising:
    indexing, by one or more computer processors, a data address in a cache storage system based on a data fingerprint of a cached data, wherein the data fingerprint is generated by a deduplication fingerprint function used for referencing deduplication of data in the cache storage system, wherein indexing the data address is based only on a middle subset of the bytes of the data fingerprint as a reference into an array that stores cache addresses in a cache address space of the cache storage system.

2. The computer-implemented method of claim 1, wherein the data fingerprint is obtained for read operations from deduplication metadata that maps different address aliases from different software logical layers to the deduplication data fingerprint.

3. The computer-implemented method of claim 1, wherein the data fingerprint is obtained for read operations from deduplication metadata that maps different address aliases from different client domains to the deduplication data fingerprint.

4. The computer-implemented method of claim 1, wherein the cache storage system is a single uniform cache for read/write operations at multiple layers of a storage subsystem, and wherein the indexing provides a uniform indexing across the multiple layers.

5. The computer-implemented method of claim 1, wherein the cache storage system is a sharded cache with sharding based on the data fingerprints generated by the deduplication fingerprint function.

6. A computer-implemented method for data operations to a cache storage system, comprising:
    obtaining, by one or more computer processors, a data fingerprint for a data of a data operation by applying a deduplication fingerprinting function to a data of a write operation, to obtain the data fingerprint generated by using a deduplication fingerprinting function used for deduplication of data in the cache storage system; and
    using an indexing service to the cache storage system having an address schema based on the data fingerprint of the data of the write operation, wherein the indexing service uses a reference based on only a middle subset of the bytes of a data fingerprint as an address into an array that stores cache addresses in a cache address space of the cache storage system.

7. The computer-implemented method of claim 6, wherein the data operation is a write operation and the method further comprises:
    receiving, by one or more computer processors, a data write operation;
    calculating, by one or more computer processors, a data fingerprint of a data of the data write operation using a fingerprint function used for deduplication of a data in the cache storage system;
    creating, by one or more computer processors, a cache entry for the data of the data write operation; and
    using the data fingerprint to address the cache entry in the cache storage system.

8. The method as claimed in claim 6, wherein the data operation is a read operation and the method further comprises:
    receiving, by one or more computer processors, a data read operation with a logical address for the data of the data read operation;
    obtaining, by one or more computer processors, a data fingerprint of the data for the data read operation from deduplication metadata by referencing the logical address; and
    using the data fingerprint to address a data in the cache storage system to attempt to read the data of the data read operation.

9. The computer-implemented method of claim 8, wherein obtaining the data fingerprint is carried out after a cache miss using an original addressing scheme of the cache storage system when a read operation comes down to a deduplication layer as it could not be serviced using the logical address.

10. The computer-implemented method of claim 8, wherein obtaining the data fingerprint and using the data fingerprint to address data is carried out prior to an original addressing scheme.

11. The computer-implemented method of claim 8, further comprising:
    allowing, by one or more computer processors, false hits of the cache storage system using the data fingerprint to address the data of the data read operation; and
    verifying, by one or more computer processors, the data fingerprint with the data fingerprint of a retrieved data.

12. The computer-implemented method of claim 8, further comprising:
    using, by one or more computer processors, only a subset of the bytes of the data fingerprint as an address into an array storing cache addresses; and
    verifying, by one or more computer processors, the data fingerprint with the data fingerprint of retrieved data.

13. The computer-implemented method of claim 8, further comprising:
    discovering, by one or more computer processors, multiple references to a data source by use of the data fingerprint addressing; and
    unifying, by one or more computer processors, the references to a data source thereby increasing the deduplication.

14. The computer-implemented method of claim 8, wherein obtaining the data fingerprint and using the data fingerprint to address the data is carried out in parallel with an original addressing scheme.

15. A computer system comprising:
one or more computer processors;
one or more computer readable storage media; and
program instructions, stored on the one or more computer readable storage media for execution by at least one of the one or more computer processors, the program instructions comprising:
program instructions to create an array that stores cache addresses into a shared cache address space, the array having references based on a data fingerprint of a cached data, wherein the data fingerprint is generated by a deduplication fingerprint function used for deduplication of a data in a cache storage system, wherein indexing the data address is based only on a middle subset of the bytes of the data fingerprint as a reference into an array that stores cache addresses in a cache address space of the cache storage system.

16. The computer system of claim 15, further comprising one or more of the following program instructions, stored on the one or more computer readable storage media for execution by at least one of the one or more computer processors, to:
obtain deduplication data fingerprints when carrying out read and write operations to the cache storage system, including:
obtain the data fingerprint for read operations from a deduplication metadata, wherein the deduplication metadata maps address aliases from different software logical layers or different client domains to the deduplication data fingerprint; and
apply a deduplication fingerprinting function to data of a write operation.

17. The computer system of claim 15, wherein the computer system includes a single uniform cache for read/write operations at multiple layers of a storage subsystem, and wherein the computer system provides a uniform indexing across the multiple layers.

18. The computer system of claim 15, further comprising one or more of the following program instructions, stored on the one or more computer readable storage media for execution by at least one of the one or more computer processors, to:
create a sharded cache with sharding based on the data fingerprints generated by the deduplication fingerprint function.

19. A cache storage system indexing system, comprising:
a data fingerprint obtaining component for obtaining a data fingerprint for data of a data operation by applying a deduplication fingerprinting function to data of a write operation and by accessing deduplication metadata for a read operation to obtain the data fingerprint generated by using a deduplication fingerprinting function used for deduplication of data in the cache storage system, wherein indexing the data address is based only on a middle subset of the bytes of the data fingerprint as a reference into an array that stores cache addresses in a cache address space of the cache storage system; and
an array lookup component for obtaining a cache address for the data of the data operation to the cache storage system by using a reference based on the data fingerprint of the data of the data operation.

20. The cache storage system indexing system of claim 19, further comprising:
a write operation component for:
receiving a data write operation;
calculating a data fingerprint of a data of the data write operation using a fingerprint function used for deduplication of a data in the cache storage system;
creating a cache entry for the data of the data write operation; and
using the data fingerprint to address the cache entry in the cache storage system; and a read operation component for:
receiving a data read operation with a logical address for a data of the data read operation;
obtaining a data fingerprint of the data of the data read operation from deduplication metadata by referencing the logical address; and
using the data fingerprint to address the data of the data write operation and the data of the data read operation in the cache storage system.

21. The cache storage system indexing system of claim 19, further comprising:
a hit verifying component for verifying the data fingerprint with the data fingerprint of retrieved data.

22. The cache storage system indexing system of claim 19, further comprising:
a reference unifying component for discovering multiple references to a data source by use of the data fingerprint addressing and unifying the references to a data source thereby increasing the deduplication.

23. A cache storage system sharded using a data fingerprint, address as a shard key, where the data fingerprint address is an address based on a data fingerprint obtained using a deduplication fingerprint function used for deduplication of data in the cache storage system, wherein indexing the data address is based only on a middle subset of the bytes of the data fingerprint as a reference into an array that stores cache addresses in a cache address space of the cache storage system.

* * * * *